(12) United States Patent
Baer et al.

(10) Patent No.: US 8,028,399 B2
(45) Date of Patent: Oct. 4, 2011

(54) MAGNETIC WRITE POLE FABRICATION

(75) Inventors: Amanda Baer, Campbell, CA (US);
Jeffrey S. Lille, Sunnyvale, CA (US);
Aron Pentek, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 960 days.

(21) Appl. No.: 11/957,481

(22) Filed: Dec. 16, 2007

(65) Prior Publication Data
US 2009/0154015 A1    Jun. 18, 2009

(51) Int. Cl.
*G11B 5/127*      (2006.01)
*H04R 31/00*    (2006.01)

(52) U.S. Cl. ............... 29/603.14; 29/603.07; 29/603.13; 29/603.15; 29/603.16; 29/603.18; 216/62; 216/65; 216/66; 360/121; 360/122; 360/317; 427/127; 427/128; 451/5; 451/41

(58) Field of Classification Search ............... 29/603.07, 29/603.13–603.16, 603.18; 216/62, 65, 66; 360/121, 122, 317; 427/127, 128; 451/5, 451/41
See application file for complete search history.

(56) References Cited

U.S. PATENT DOCUMENTS

| | | | |
|---|---|---|---|
| 5,027,246 A | 6/1991 | Numazawa et al. | |
| 5,438,011 A | 8/1995 | Blalock et al. | |
| 6,301,076 B1 | 10/2001 | Stageberg et al. | |
| 6,540,928 B1 * | 4/2003 | Kobrin et al. | 216/22 |
| 6,547,975 B1 | 4/2003 | Kobrin | |
| 6,700,759 B1 | 3/2004 | Knapp et al. | |
| 6,859,998 B2 | 3/2005 | Kruger et al. | |
| 6,862,798 B2 | 3/2005 | Kruger et al. | |
| 7,023,658 B1 * | 4/2006 | Knapp et al. | 360/125.56 |
| 7,133,255 B2 | 11/2006 | Lille et al. | |
| 7,134,185 B1 | 11/2006 | Knapp et al. | |
| 2005/0141137 A1 | 6/2005 | Okada et al. | |
| 2006/0044682 A1 | 3/2006 | Le et al. | |
| 2006/0152850 A1 | 7/2006 | Hsu et al. | |
| 2006/0171069 A1 | 8/2006 | Bedell et al. | |
| 2006/0174474 A1 | 8/2006 | Le | |
| 2006/0238918 A1 | 10/2006 | Kato et al. | |

FOREIGN PATENT DOCUMENTS

| | | |
|---|---|---|
| JP | 2000242910 | 9/2000 |
| JP | 2006114076 | 4/2006 |
| WO | W00239432 | 5/2002 |

* cited by examiner

*Primary Examiner* — Paul D Kim
(74) *Attorney, Agent, or Firm* — Duft Bornsen & Fishman, LLP

(57) ABSTRACT

Write elements and methods of fabricating magnetic write poles are described. For one method, a vertical mask structure is formed on a magnetic layer in locations of a pole tip and a yoke of a write pole. The vertical mask structure may be formed by coating vertical surfaces of resists with an atomic layer deposition (ALD) process or a similar process. A removal process is then performed around the vertical mask structure to define the pole tip and part of the yoke of the write pole, and the vertical mask structure is removed. A lower portion of the pole tip is them masked while the upper portion of the pole tip and the part of the yoke is exposed. The upper portion of the pole tip and the part of the yoke are then expanded with magnetic material, such as with a plating process.

16 Claims, 13 Drawing Sheets

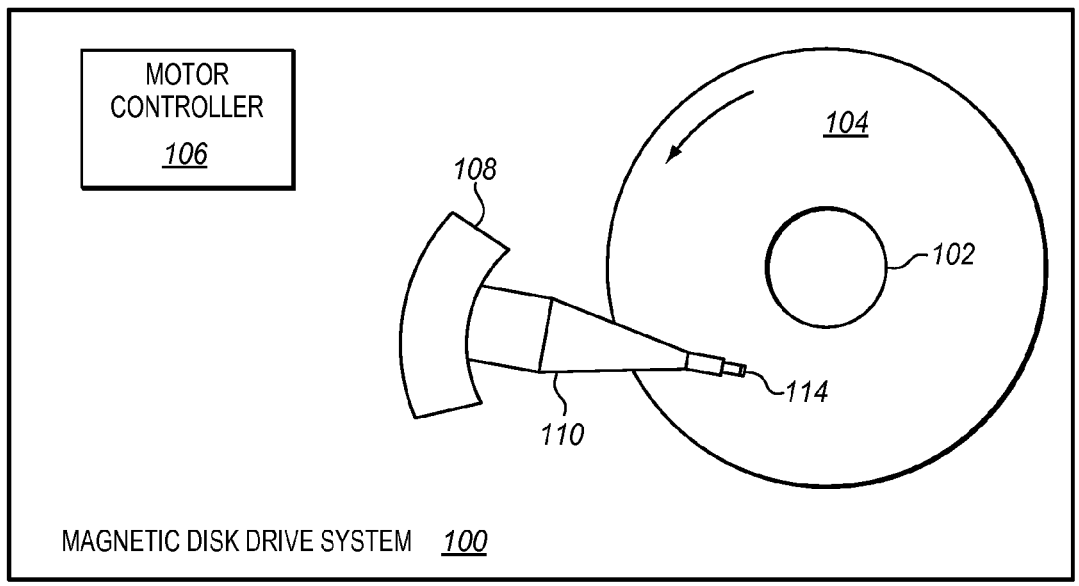
FIG. 1
FIG. 2
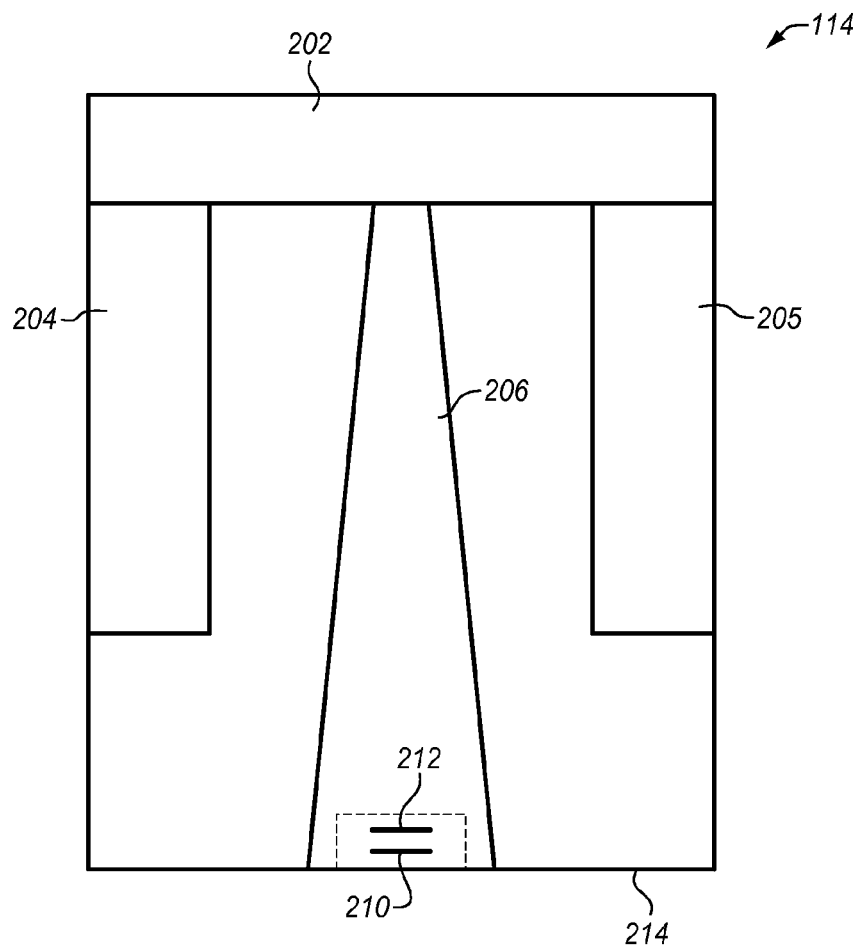

MAGNETIC WRITE POLE FABRICATION

BACKGROUND OF THE INVENTION

1. Field of the Invention

The invention is related to the field of magnetic disk drive systems and, in particular, to fabricating a magnetic write pole in a recording head of a magnetic disk drive system.

2. Statement of the Problem

Many computer systems use magnetic disk drives for mass storage of information. Magnetic disk drives typically include one or more magnetic recording heads (sometimes referred to as sliders) that include read elements and write elements. A suspension arm holds the recording head above a magnetic disk. When the magnetic disk rotates, an air flow generated by the rotation of the magnetic disk causes an air bearing surface (ABS) side of the recording head to ride a particular height above the magnetic disk. The height depends on the shape of the ABS. As the recording head rides on the air bearing, an actuator moves an actuator arm that is connected to the suspension arm to position the read element and the write element over selected tracks of the magnetic disk.

A typical write element includes write pole and a return pole. The write pole has a yoke portion and a pole tip portion. The pole tip extends from the ABS of the recording head to the yoke of the write pole. The point where the pole tip meets the yoke is referred to as the flare point. This point where the yoke begins has a trapezoidal shape that flares outwardly from the pole tip. The yoke of the write pole then connects to the return pole through a back gap. A coil wraps around a yoke or back gap to provide the magnetic flux used for the write operation. The width of the pole tip controls the track width that is written by the recording head, so the width of the pole tip is preferably small (i.e., less than 100 nanometers).

It is a problem with present fabrication techniques to fabricate a pole tip having smaller widths, such as less than about 70 nanometers. A pole tip is typically defined using a photo-lithographic process to pattern a photo-resist. An etching process is then performed to define the pole tip based on the pattern of the photo-resist. Unfortunately, if a photo-resist is sufficiently thin, such as less than 70 nanometers, the photo-resist does not hold its shape and does not adequately provide a mask for an etching process used to define the pole tip. Thus, the width of the pole tip is limited by the tolerances of photo-lithography, which may not be small enough for high density recording. Similarly, an additive process has lithographic restrictions where the width of the final pole has the same tolerances.

SUMMARY OF THE SOLUTION

Embodiments of the invention solve the above and other related problems with improved methods of fabricating magnetic write poles. The fabrication techniques described herein allow for narrower pole tip widths (e.g., 30-60 nanometers) of the write pole. At the same time, the write pole has a desired or reduced magnetic reluctance.

According to a fabrication technique in one embodiment of the invention, a vertical mask structure is formed on a magnetic layer. The vertical mask structure may be formed by placing resist structures on the magnetic layer, and then performing an atomic layer deposition (ALD) process or a similar process to coat the vertical surfaces and the horizontal surfaces of the resist structure with a material, such as alumina. The horizontal surfaces may be milled away and the resists removed leaving the vertical mask structure.

A removal process may then be performed around the vertical mask structure to define the pole tip and part of the yoke of the write pole, and the vertical mask structure is removed. A lower portion of the pole tip is them masked while the upper portion of the pole tip and the part of the yoke is exposed. The upper portion of the pole tip and the part of the yoke are then expanded with magnetic material, such as with a plating process, and the mask is removed. The lower portion of the pole tip thus maintains its initial width, such as 60 nanometers or less, which allows for the small track width during recording processes. The upper portion of the pole tip gets expanded wider than the lower portion, which allows the write pole to provide adequate flux to the ABS. Further, part of the yoke is expanded at the same time as the upper portion of the pole tip which reduces the magnetic reluctance in the write pole.

The invention may include other exemplary embodiments described below.

DESCRIPTION OF THE DRAWINGS

The same reference number represents the same element or same type of element on all drawings.

FIG. 1 illustrates a magnetic disk drive system in an exemplary embodiment of the invention.

FIG. 2 illustrates a recording head in an exemplary embodiment of the invention.

DETAILED DESCRIPTION OF THE INVENTION

Figure 3:
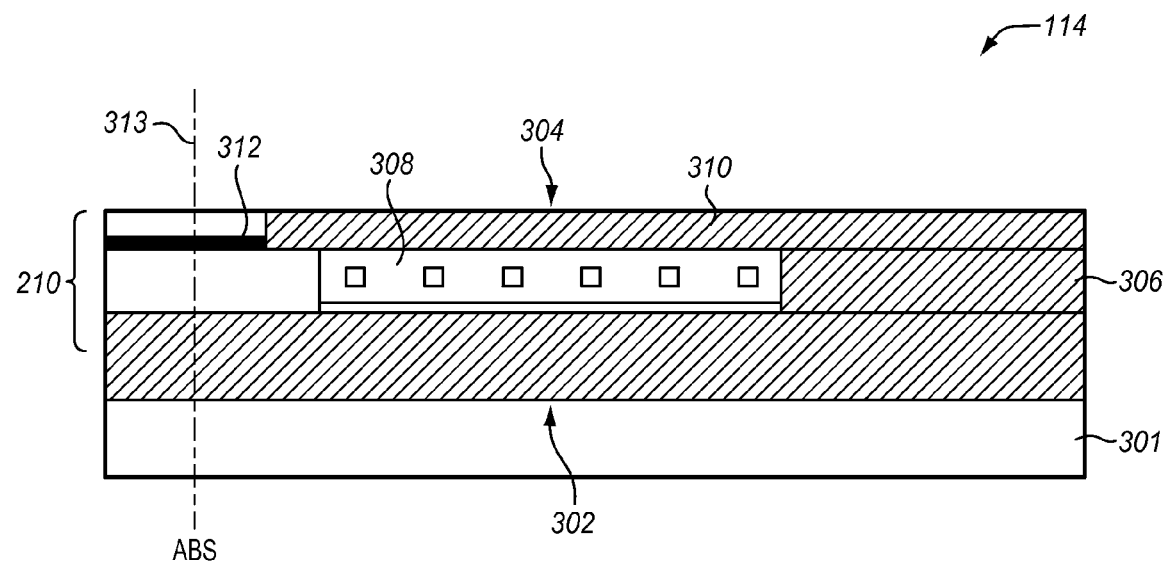
FIG. 3 is a cross-sectional view of a recording head in an exemplary embodiment of the invention.

FIGS. 1-29 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

FIG. 1 illustrates a magnetic disk drive system 100 in an exemplary embodiment of the invention. Magnetic disk drive system 100 includes a spindle 102, a magnetic recording disk 104, a motor controller 106, an actuator 108, an actuator/suspension arm 110, and a recording head 114. Spindle 102 supports and rotates magnetic recording disk 104 in the direction indicated by the arrow. A spindle motor (not shown) rotates spindle 102 according to control signals from motor controller 106. Recording head 114 is supported by actuator/suspension arm 110. Actuator/suspension arm 110 is connected to actuator 108 that is configured to rotate in order to position recording head 114 over a desired track of magnetic recording disk 104. Magnetic disk drive system 100 may include other devices, components, or systems not shown in FIG. 1. For instance, a plurality of magnetic disks, actuators, actuator/suspension arms, and recording heads may be used.

When magnetic recording disk 104 rotates, an air flow generated by the rotation of magnetic disk 104 causes an air bearing surface (ABS) of recording head 114 to ride on a cushion of air at a particular height above magnetic disk 104. The height depends on the shape of the ABS. As recording head 114 rides on the cushion of air, actuator 108 moves actuator/suspension arm 110 to position a read element (not shown) and a write element (not shown) in recording head 114 over selected tracks of magnetic recording disk 104.

FIG. 2 illustrates recording head 114 in an exemplary embodiment of the invention. The view of recording head 114 is of the ABS side of recording head 114, which is the surface of the page in FIG. 2. Recording head 114 has a cross rail 202, two side rails 204-205, and a center rail 206 on the ABS side. The rails on recording head 114 illustrate just one embodiment, and the configuration of the ABS side of recording head 114 may take on any desired form. Recording head 114 also includes a write element 210 and a read element 212 on a trailing edge 214 of recording head 114.

FIG. 3 is a cross-sectional view of recording head 114 in an exemplary embodiment of the invention. This view of recording head 114 illustrates the layers forming write element 210. Those skilled in the art understand that recording head 114 further includes a read element that is similarly formed using thin-film deposition techniques. FIG. 3 illustrates the layers of recording head 114 as deposited, and those skilled in the art will appreciate that recording head 114 will be lapped (from the left in FIG. 3) to the desired ABS plane 313.

Write element 210 includes a return pole 302 that is formed on a non-magnetic layer 301. Non-magnetic layer 301 is generally a layer between write element 210 and read element 212 (not shown). Write element 210 further includes a write pole 304 (or main pole). Write pole 304 is comprised of a yoke portion 310 and a pole tip 312. Pole tip 312 is located proximate to the ABS of recording head 114 and extends inward to connect with yoke portion 310. Write pole 304 and return pole 302 are connected to each other through a back-gap layer 306. An inductive coil 308 is sandwiched between the poles 302 and 304. The rest of coil is not shown as it extends further back in recording head 114. Write element 210 may include other layers not shown, and may take on other configurations in other embodiments. For instance, a trailing shield or wrap around shield may be formed around pole tip 312 in some embodiments.

Figure 4:
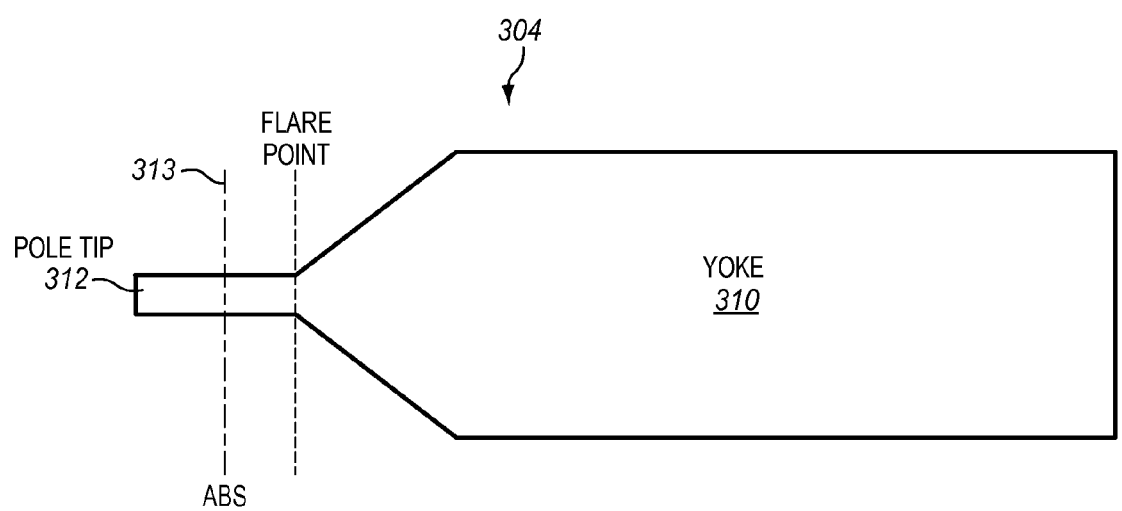
FIG. 4 is a top view of a write pole in an exemplary embodiment of the invention.

FIG. 4 is a top view of a write pole 304 in an exemplary embodiment of the invention. This view of write pole 304 illustrates the trapezoidal shape of write pole 304. As in FIG. 3, write pole 304 includes pole tip 312 and yoke portion 310. Pole tip 312 extends from the ABS of the recording head to yoke 310. The point where pole tip 312 meets yoke 310 is referred to as the flare point. At the flare point, yoke 310 flares outwardly from pole tip 312 to a width significantly wider than pole tip 312. Again, those skilled in the art will appreciate that write pole 304 will be lapped (from the left in FIG. 4) to the desired ABS plane 313.

As previously stated above, one difficulty in fabricating write elements is fabricating a pole tip that has a narrow width (e.g., 60 nanometers or less). The following flow charts illustrate improved methods of fabricating a write element.

Figure 5:
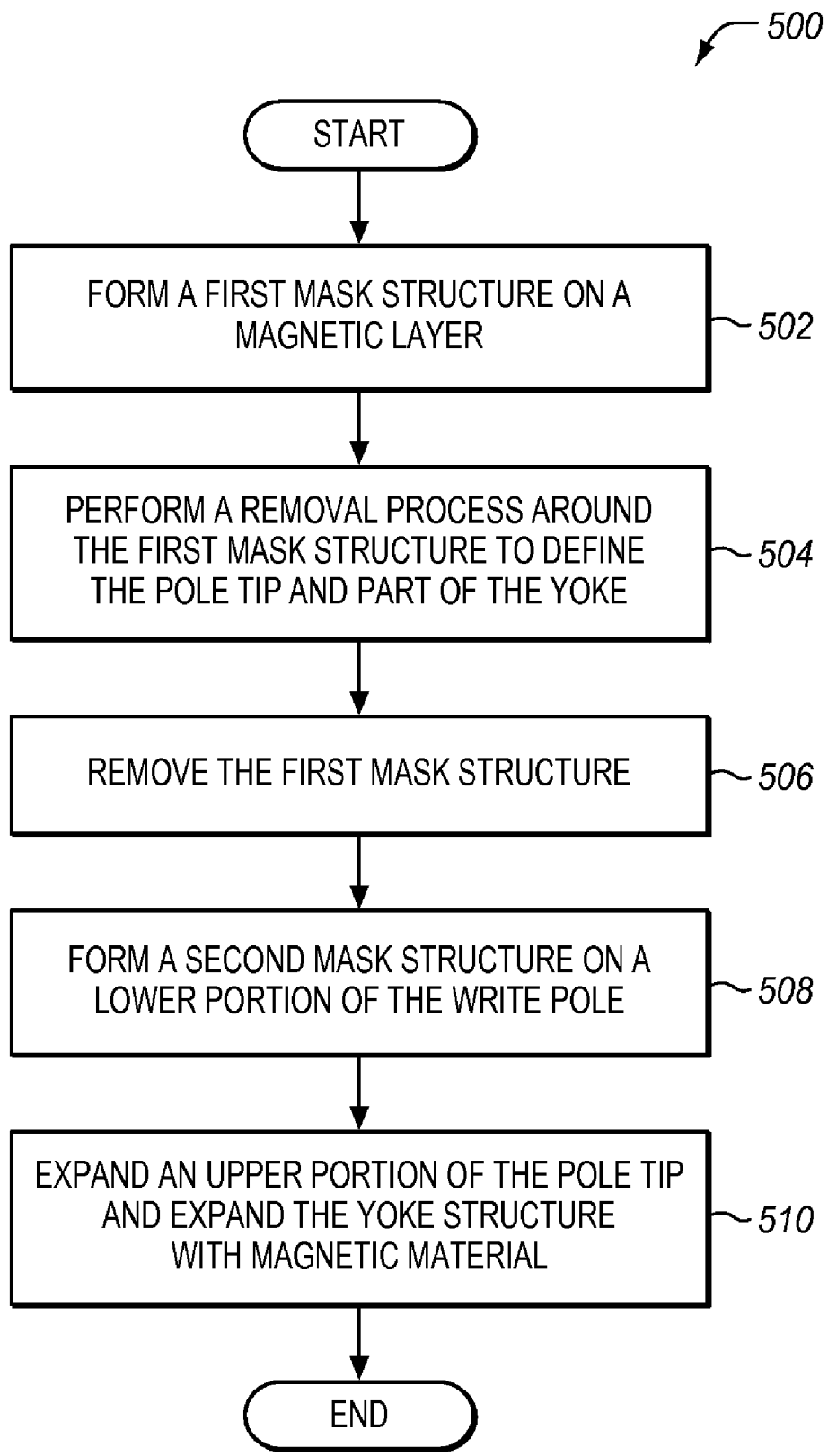
FIG. 5 is a flow chart illustrating a method of fabricating a magnetic write pole in an exemplary embodiment of the invention.

FIG. 5 is a flow chart illustrating a method 500 of fabricating a magnetic write pole in an exemplary embodiment of the invention. Method 500 may be used to form magnetic write pole 304 as shown in FIGS. 3-4. FIGS. 6-9 are cross-sectional views of a write pole being fabricated according to method 500. FIGS. 10-13 are top views of the write pole being further fabricated according to method 500.

Figure 6:
FIGS. 6-9 are cross-sectional views of a write pole being fabricated according to the method of FIG. 5 in an exemplary embodiment of the invention.

In FIG. 6, a layer 602 of magnetic material, such as NiFe or CoFe, is shown as being deposited on a layer 601 of non-magnetic material, such as alumina. Layer 602 will be used to form a pole tip of a write pole, and parts of a yoke of the write pole. For the view of FIG. 6, the ABS of the write pole is the surface of the page.

Figure 7:
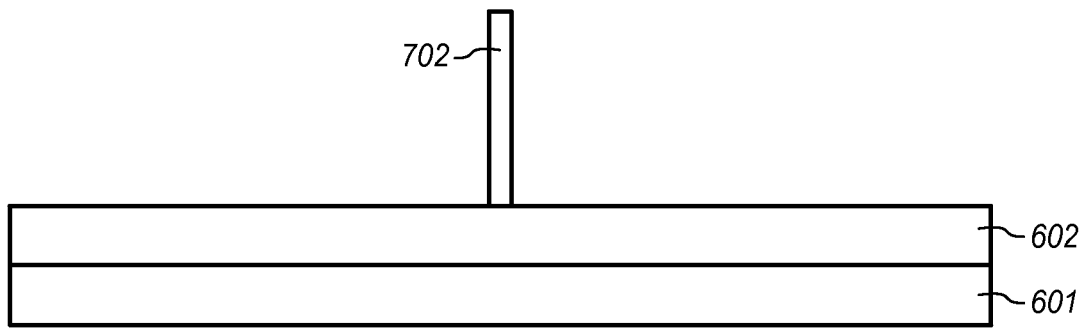
Figure 10:
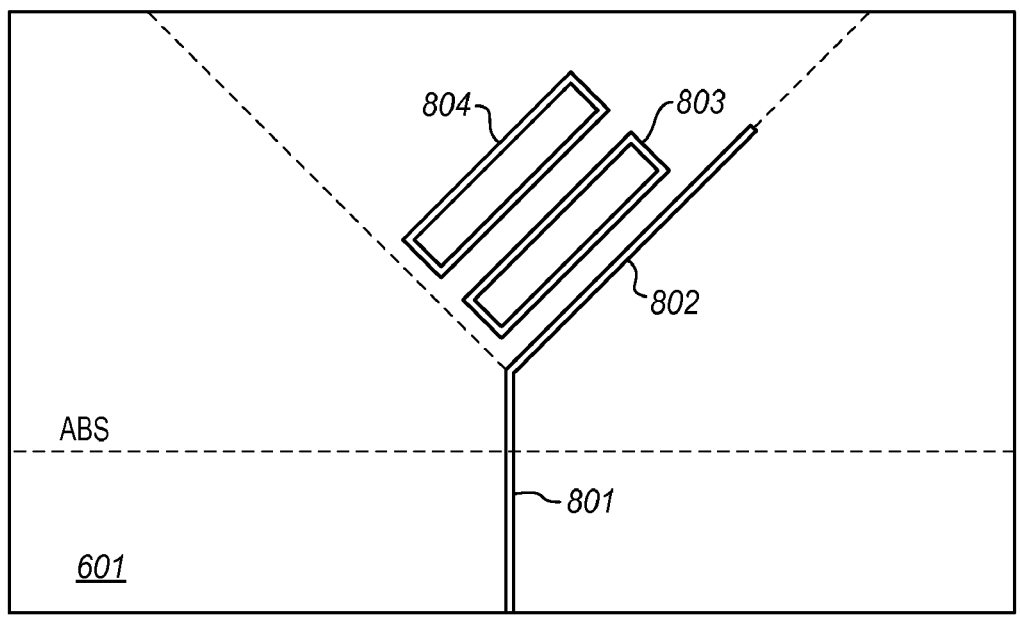
FIGS. 10-13 are top views of the write pole being further fabricated according to the method of FIG. 5 in an exemplary embodiment of the invention.

Step 502 of method 500 comprises forming a first mask structure 702 on magnetic layer 602 (see FIG. 7). A mask structure comprises any material(s) that protect underlying materials from a subsequent deposition process, plating process, etching process, or similar process. Mask structure 702 is formed from a material, such as alumina, that is substantially rigid in order to hold its form when being substantially thin as the width of mask structure 702 may be 150 nanometers or less. Although mask structure 702 is illustrated as a single vertical bar in FIG. 7, mask structure 702 may actually have a desired pattern that is more than a single bar. An exemplary pattern is illustrated in FIG. 10 to define a pole tip and part of a yoke in a write pole. The location of mask structure 702 as shown in FIG. 7 corresponds with a pole tip being formed for the write pole. The location of mask structure 702 may also correspond with part of a yoke being formed for the write pole, such as illustrated in FIG. 10.

Figure 8:
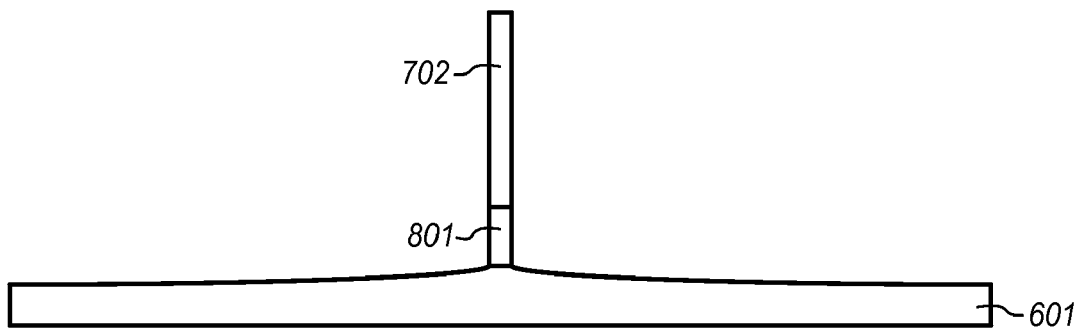

Step 504 in FIG. 5 comprises performing a removal process around mask structure 702 to remove the portions of magnetic layer 602 that are exposed by mask structure 702 (see FIG. 8). The removal process may comprise an etching process or another type of process. The result of the removal process is one or more traces 801 are defined in magnetic layer 602. A trace comprises one or more strips of magnetic material or an area of magnetic material formed after the removal process of step 504. In FIG. 8, trace 801 represents the pole tip of the write pole. Step 506 comprises removing mask structure 702 after the removal process (see FIG. 9).

FIG. 10 is a top view of the write pole to illustrate the traces in magnetic layer 602 in an exemplary embodiment of the invention. To orient the reader, the surface of trace 801 (the pole tip) that is visible in FIG. 9 faces downward in FIG. 10. Thus, the ABS of the pole tip will be toward the bottom of FIG. 10. Furthermore, the surface of the underlying non-magnetic layer 601 may be also slanted by the pole formation process.

Figure 9:
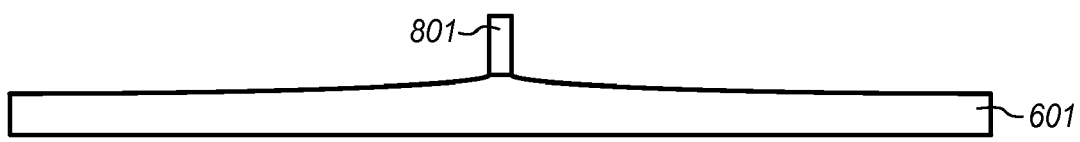

The traces 801 and traces 802-804 are illustrated as heavy lines. Trace 801 represents the trace generated by etching around mask structure 702 as illustrated in FIGS. 8-9. Traces 802-804 are further generated by etching around mask structure 702 based on the pattern of mask structure 702, even though such a pattern was not visible in FIGS. 8-9. The dotted lines in FIG. 10 represent the actual location of the yoke of the write pole after subsequent fabrication steps. The traces 801-804 illustrated in FIG. 10 are just one example, and may have many different configurations in other embodiments.

In FIG. 10, one of the traces 801 defines the pole tip. More particularly, trace 801 defines an initial width of the pole tip, which is further processed as described below to have a desired shape. Through use of mask structure 702 (see FIG. 7), the initial width of the pole tip may be 60 nanometers or less, which is narrower than many conventional pole tips.

Other traces 802-804 define part of the yoke of the write pole. The actual yoke of the write pole will be much larger and thicker, but having traces 802-804 defined in the same processing steps as the pole tip provides advantages. Trace 802 (and traces 803-804 after further processing steps) is in contact with the pole tip. Because they are fabricated in the same steps, there will be a good connection between the pole tip and the yoke. Traces 802-804 may collectively be referred to as a corrugated yoke structure.

Figure 11:
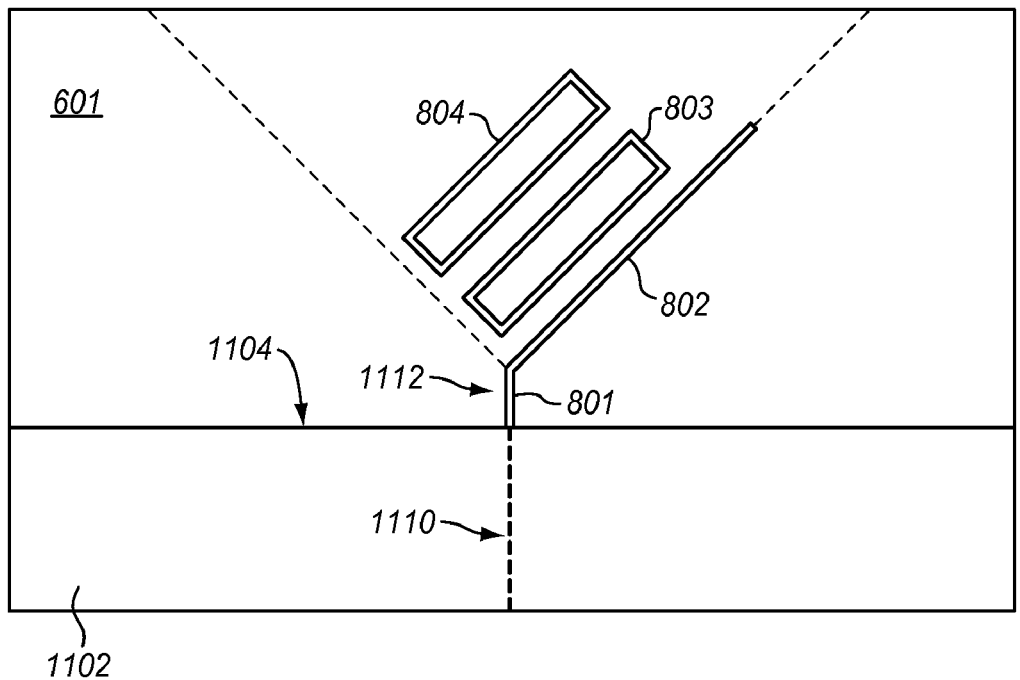

Step 508 of method 500 comprises forming a second mask structure 1102 on a lower portion 1110 of the pole tip (see FIG. 11). The lower portion 1110 of the pole tip is proximate to an air bearing surface or a writing surface of the write pole. An upper portion 1112 of the pole tip is proximate to the yoke of the write pole as opposed to the air bearing surface. One edge 1104 of mask structure 1102 (which is the top edge in FIG. 11) defines the future flare point for the write pole.

Figure 12:
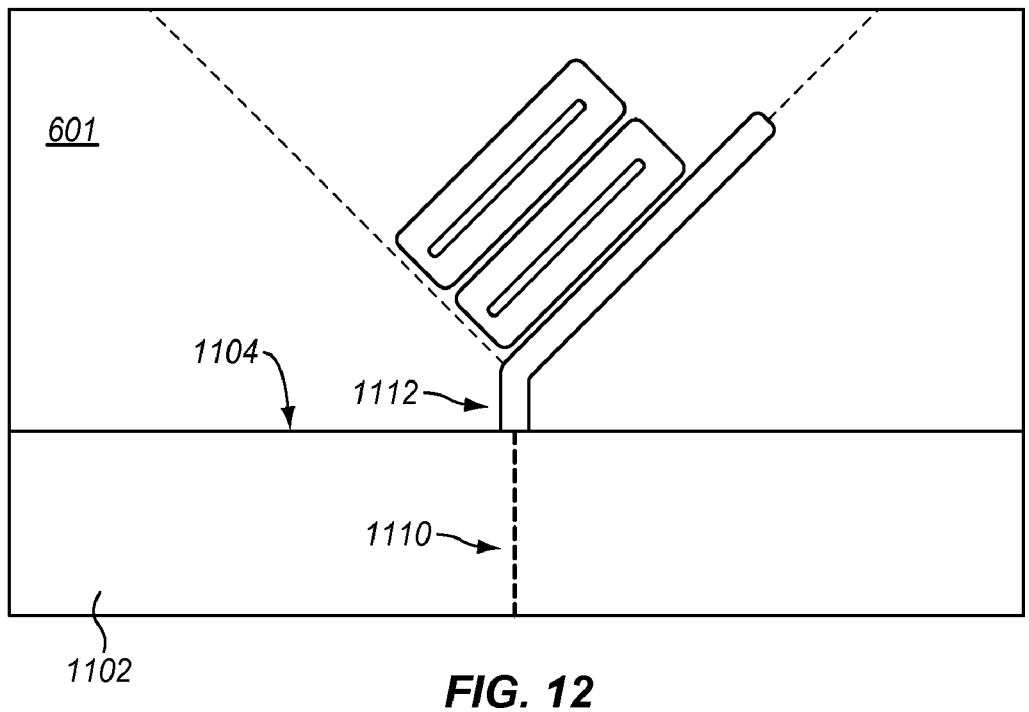
Figure 13:
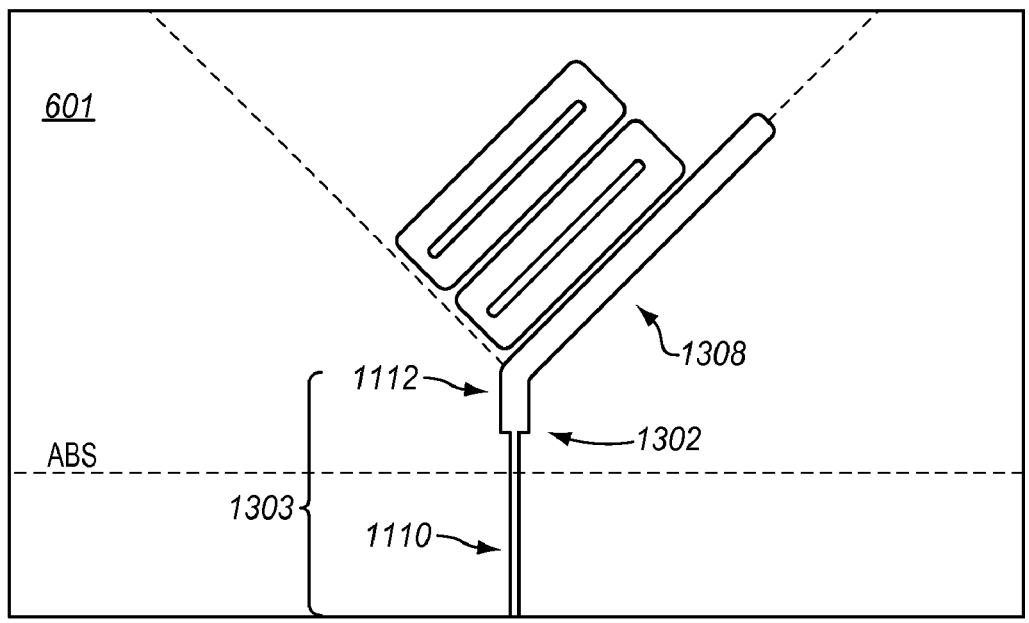

Step 510 comprises expanding the upper portion 1112 of the pole tip with magnetic material to increase the initial width of the upper portion 1112 (see FIG. 12). Step 510 further comprises expanding the yoke structure with the magnetic material to increase the initial width of the yoke structure. The upper portion 1112 of the pole tip and the yoke structure may be expanded by plating the magnetic material (e.g., NiFe) on the traces 801-804 exposed by mask structure 1102. Mask structure 1102 may then be removed (see FIG. 13) to expose the pole tip, which is indicated by reference number 1303. The yoke structure is illustrated in FIG. 13 by reference number 1308.

Step 1414 may expand the upper portion 1112 of pole tip 1303 and yoke structure 1308 by less than three times the width of the lower portion 1112 of pole tip 1303. Thus, if the lower portion 1110 of pole tip 1303 has a width of less than 60 nanometers, then the upper portion 1112 of pole tip 1303 and yoke structure 1308 may be expanded to have a width less than about 180 nanometers. The point where pole tip 1303 expands from its initial width to the expanded width defines the flare point 1302 of the write pole.

The lower portion 1110 of pole tip 1303 remains at the initial width of about 60 nanometers or less to effectively write to small data tracks during a write operation. At the same time, the upper portion 1112 of pole tip 1303 is wider to provide adequate magnetic flux to the ABS of the write pole. Further, because pole tip 1303 and yoke structure 1308 are formed in the same fabrication steps, there is low reluctance in the write pole.

With the pole tip formed according to a desired shape and the yoke structure partially formed, a trailing shield or a wrap-around shield may then be formed proximate to the pole tip. Also, additional yoke material may be formed on the yoke structure (e.g., a yoke stitch layer). Formation of the shields and additional yoke material is shown in the following embodiment.

Figure 14:
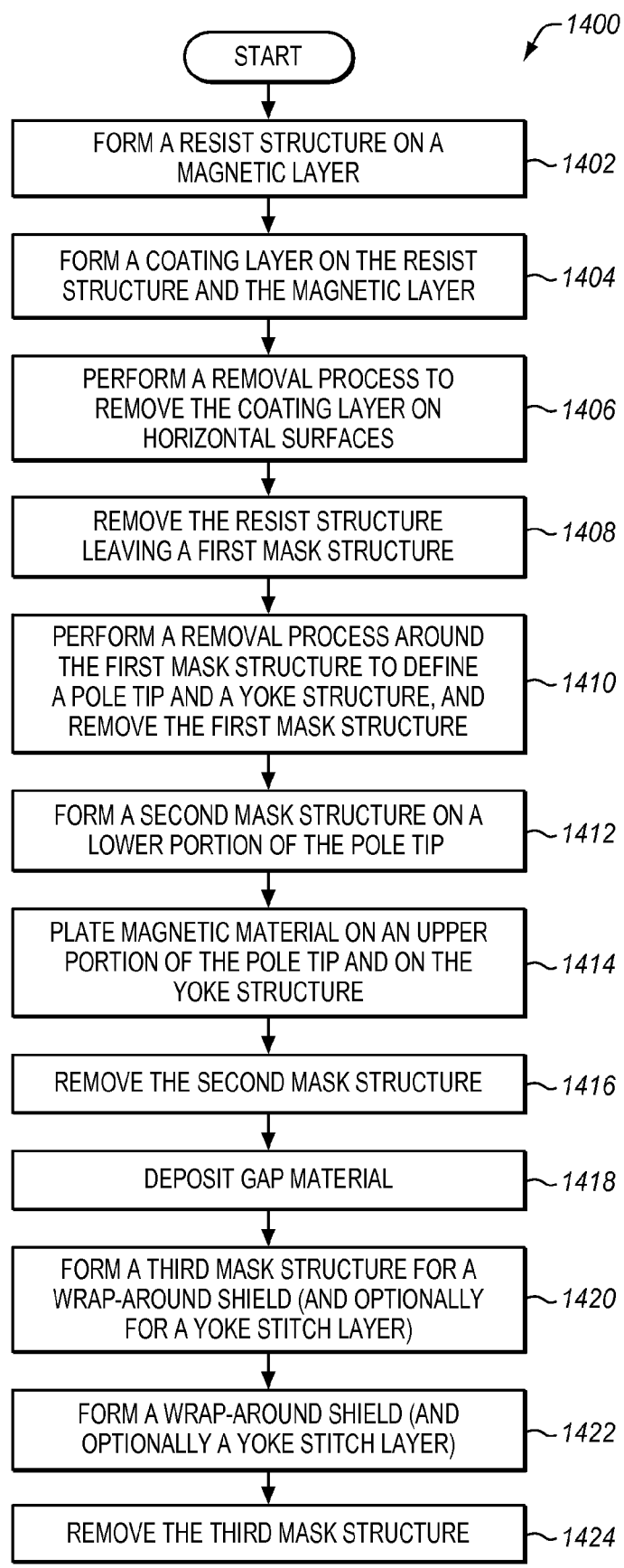
FIG. 14 is a flow chart illustrating a more detailed method of fabricating a magnetic write pole in an exemplary embodiment of the invention.

FIG. 14 is a flow chart illustrating a more detailed method 1400 of fabricating a magnetic write pole in an exemplary embodiment of the invention. Method 1400 may be used to fabricate magnetic write pole 304 as shown in FIGS. 3-4. FIGS. 15-21 are cross-sectional views of a write pole being fabricated according to method 1400. FIGS. 22-29 are top views of the write pole being further fabricated according to method 1400.

Figure 15:
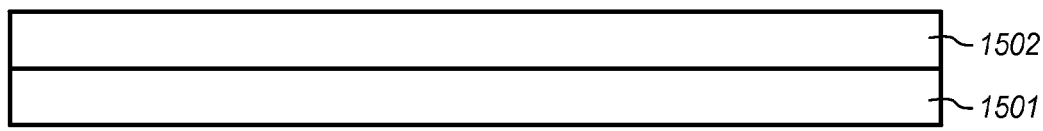
FIGS. 15-21 are cross-sectional views of a write pole being fabricated according to the method of FIG. 14 in an exemplary embodiment of the invention.

In FIG. 15, a layer 1502 of magnetic material, such as NiFe, is shown as being deposited on a layer 1501 of non-magnetic material, such as alumina. Layer 1502 will be used to form a pole tip of a write pole, and parts of a yoke of the write pole. For the view of FIG. 15, the ABS of the write pole is the surface of the page.

Figure 16:
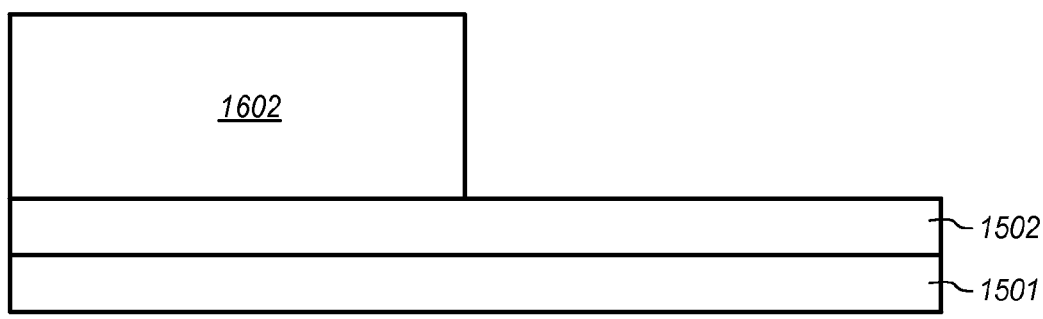
Figure 17:
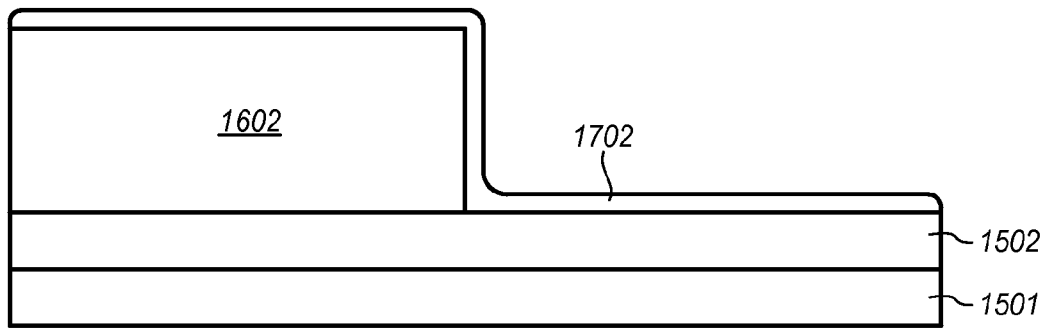
Figure 18:
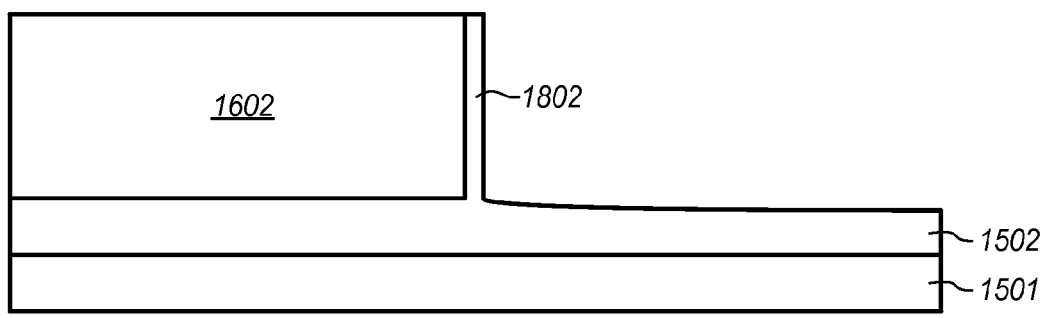
Figure 22:
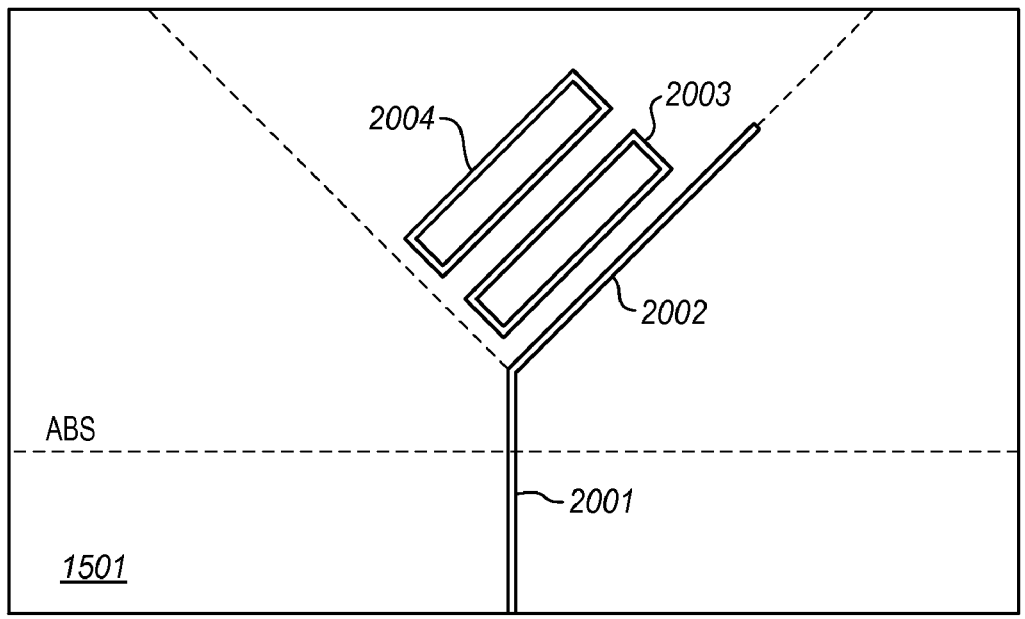
FIGS. 22-29 are top views of the write pole being further fabricated according to the method of FIG. 14 in an exemplary embodiment of the invention.

Step 1402 of method 1400 comprises forming a resist structure 1602 on magnetic layer 1502 (see FIG. 16). Resist structure 1602 may be comprised of a polyimide material, such as DURIMIDE®. The pattern and placement of resist structure 1602 depend on desired trace patterns to be etched in magnetic layer 1502. The pattern of the traces will depend on the vertical surfaces of resist structure 1602. Thus, one of the vertical surfaces will correspond with the location of the pole tip of the write pole. Other vertical surfaces of resist structure 1602 will correspond with the location of the yoke structure of the write pole. One vertical surface of resist structure 1602 is shown in FIG. 16 which corresponds with the location of the pole tip, but the actual pattern resembles that which is shown in FIG. 22.

Step 1404 comprises forming a coating layer 1702 on resist structure 1602 and the exposed portions of magnetic layer 1502. The process of forming coating layer 1702 is performed in such a manner that coating layer 1702 conforms well to both horizontal surfaces of resist structure 1602 and vertical surfaces of resist structure 1602. For instance, coating layer 1702 may be comprised of an alumina material that is formed on resist structure 1602 using an atomic layer deposition (ALD) process. An ALD process may be performed at higher temperatures, such as 180 degrees Celsius. Thus, forming resist structure 602 from a polyimide material allows it to hold its form well at these high temperatures.

The thickness of coating layer 1702 will correspond with the thickness of the traces that will be formed in magnetic layer 1502. Thus, if coating layer 1702 is formed at 60 nanometers, then the traces formed in magnetic layer 1502 will be about 60 nanometers. If coating layer 1702 is formed at 30 nanometers, then the traces formed in magnetic layer 1502 will be about 30 nanometers. The transfer of mask dimensions into pole dimensions depends on the etching process. Therefore, a difference between mask and pole width may occur.

Step 1406 comprises performing a removal process to remove coating layer 1702 on horizontal surfaces of resist structure 1602 and magnetic layer 1502. The removal process of step 1406 leaves the coating layer on the vertical surfaces of resist structure 1602 resulting in first mask structure 1802 (see FIG. 18). The removal process may comprise a reactive ion etching (RIE) process or an ion milling process that is performed substantially orthogonal to the substrate to remove the horizontal surfaces but leave the vertical surfaces.

Coating layer 1702 (e.g., alumina) has the properties of being rigid even at narrow widths. While a traditional photoresist does not maintain its shape at narrow widths, such as 60 nanometers, mask structure 1820 formed from coating layer 1702 is able to maintain its shape at narrow widths, such as 60 nanometers.

Figure 19:
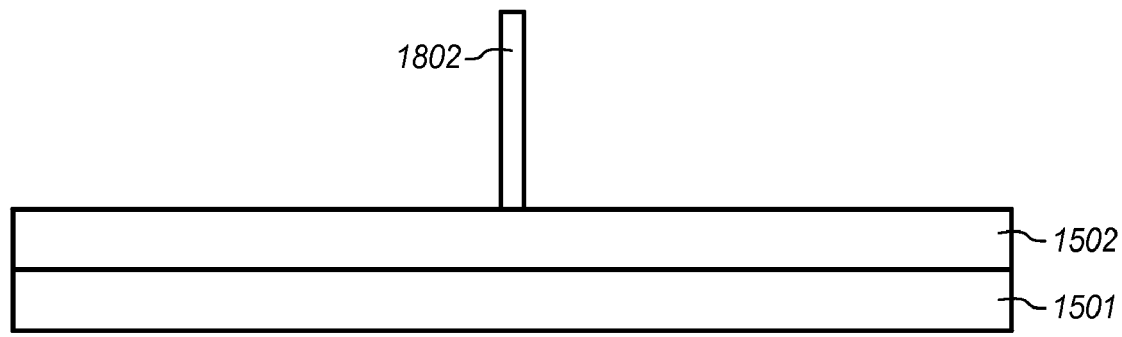

Step 1408 comprises removing resist structure 1602 leaving the desired mask structure 1802 (see FIG. 19). Although FIG. 19 only shows a mask structure corresponding with the location of a pole tip, mask structure 1802 may be formed for other locations of the write pole, such as the location of the yoke (see FIG. 22).

Figure 20:
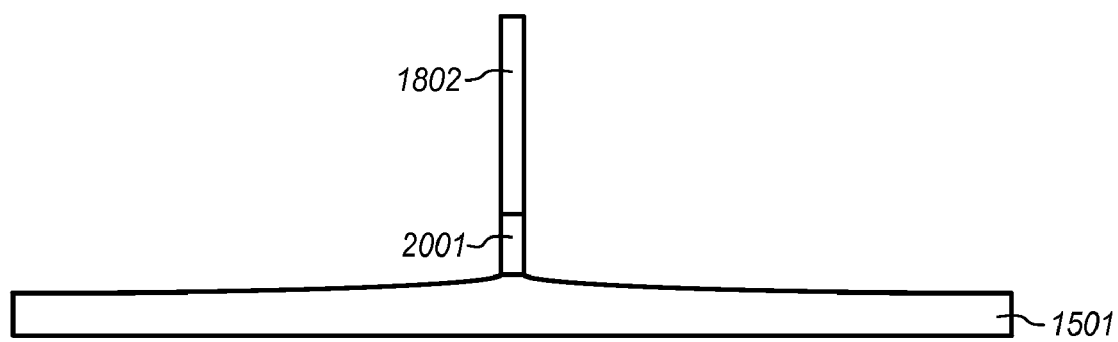
Figure 21:
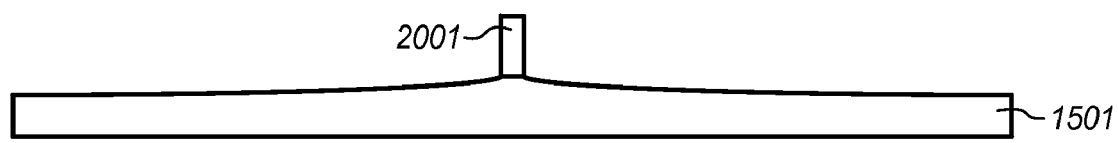

Step 1410 comprises performing a removal process around mask structure 1802 to remove the portions of magnetic layer 1502 that are exposed by mask structure 1802 (see FIG. 20). The result of the removal process is one or more traces 2001

(e.g., a strips of magnetic material formed after the removal process) are defined in magnetic layer 1502. The removal process may comprise an etching process or another type of process. Step 1412 comprises removing mask structure 1802 after the removal process (see FIG. 21).

FIG. 22 is a top view of the write pole to illustrate the traces in magnetic layer 1502 in an exemplary embodiment of the invention. To orient the reader, the surface of trace 2001 (the pole tip) that is visible in FIG. 21 faces downward in FIG. 22. Thus, the ABS of the pole tip will be toward the bottom of FIG. 22.

The traces 2001-2004 are illustrated as heavy lines. The dotted lines in FIG. 22 represent the actual location of the yoke of the write pole after subsequent fabrication steps. The traces 2001-2004 illustrated in FIG. 22 are just one example, and may have many different configurations in other embodiments.

In this embodiment, one of the traces 2001 defines a pole tip of the write pole. More particularly, trace 2001 defines an initial width of the pole tip, which is further processed as described below to have a desired shape. Through use of mask structure 1802 (see FIG. 18), the initial width of the pole tip may be 60 nanometers or less, which is narrower than many conventional pole tips.

Other traces 2002-2004 define part of the yoke of the write pole. The actual yoke of the write pole will be much larger and thicker, but having traces 2002-2004 defined in the same processing steps as the pole tip provides advantages. Trace 2002 (and traces 2003-2004 after further processing steps) are in contact with the pole tip. Because they are fabricated in the same steps, there will be a good connection between the pole tip and the yoke. Traces 2002-2004 may collectively be referred to as a yoke structure.

Figure 23:
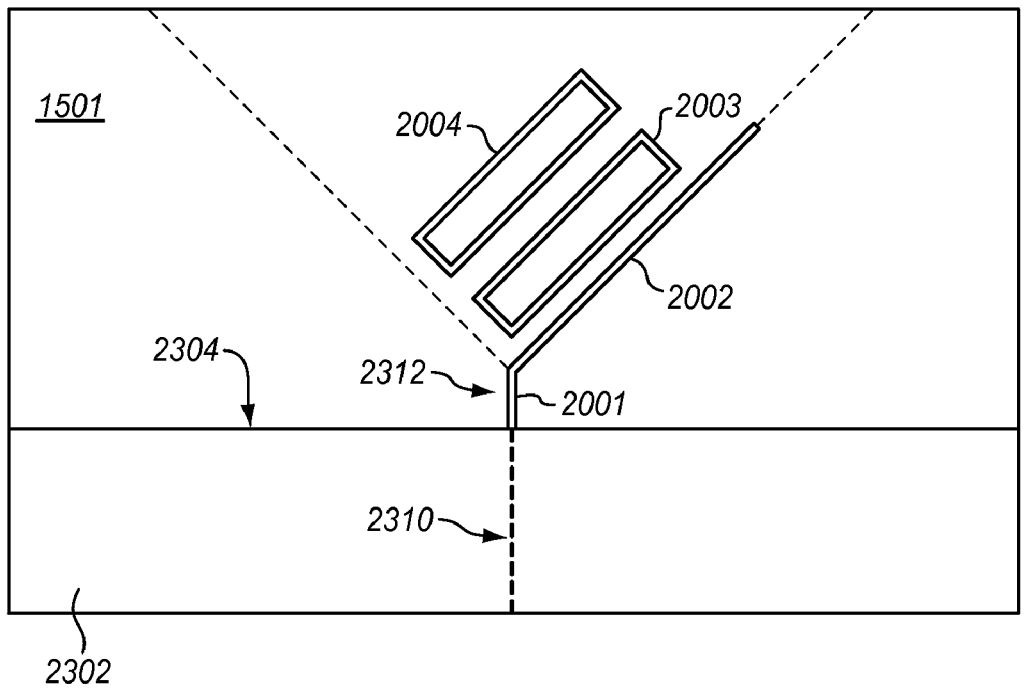

Step 1412 of method 1400 comprises forming a second mask structure 2302 on a lower portion 2310 of the pole tip (see FIG. 23). The lower portion 2310 of the pole tip is proximate to an air bearing surface or a writing surface of the write pole. An upper portion 2312 of the pole tip is proximate to the yoke of the write pole as opposed to the air bearing surface. One edge 2304 of mask structure 2302 (which is the top edge in FIG. 23) defines the future flare point for the write pole.

Figure 24:
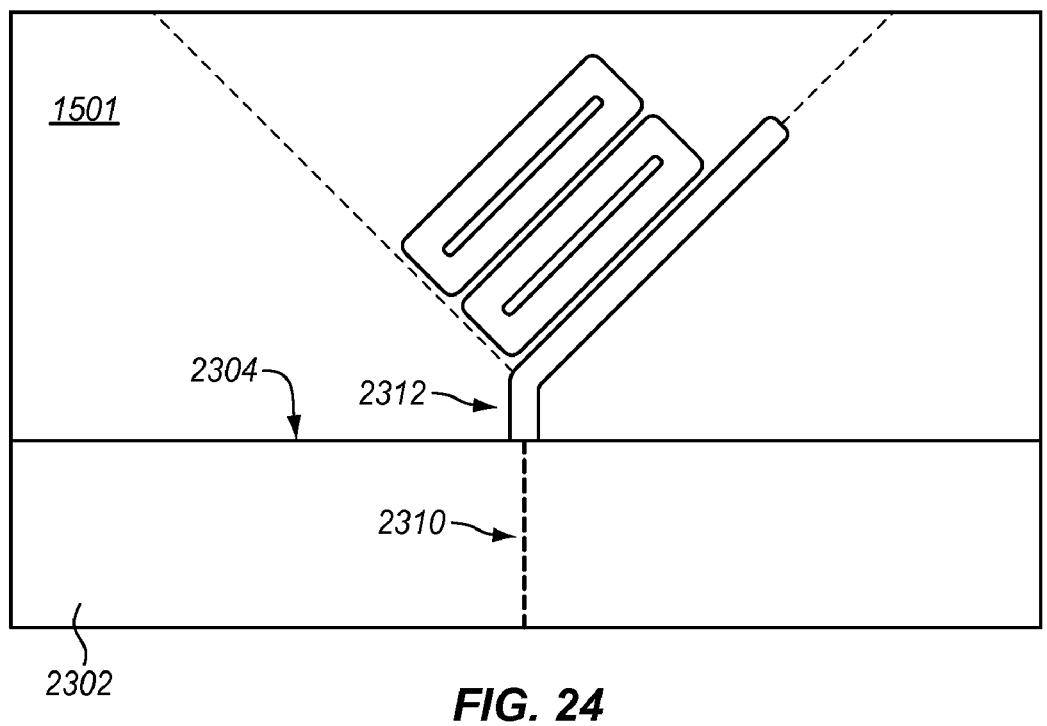
Figure 25:
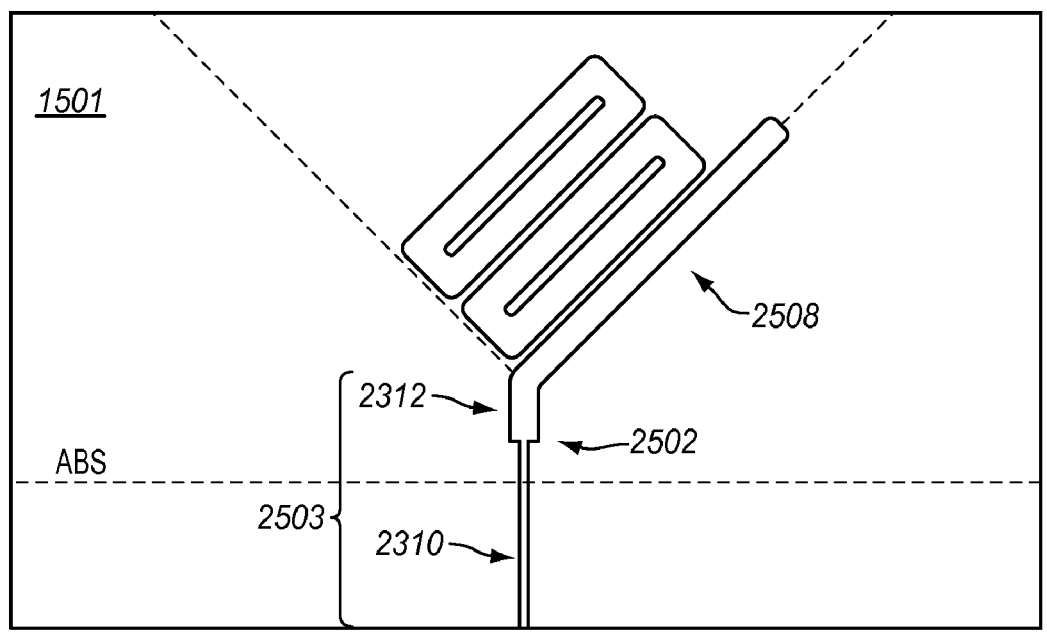
Figure 26:
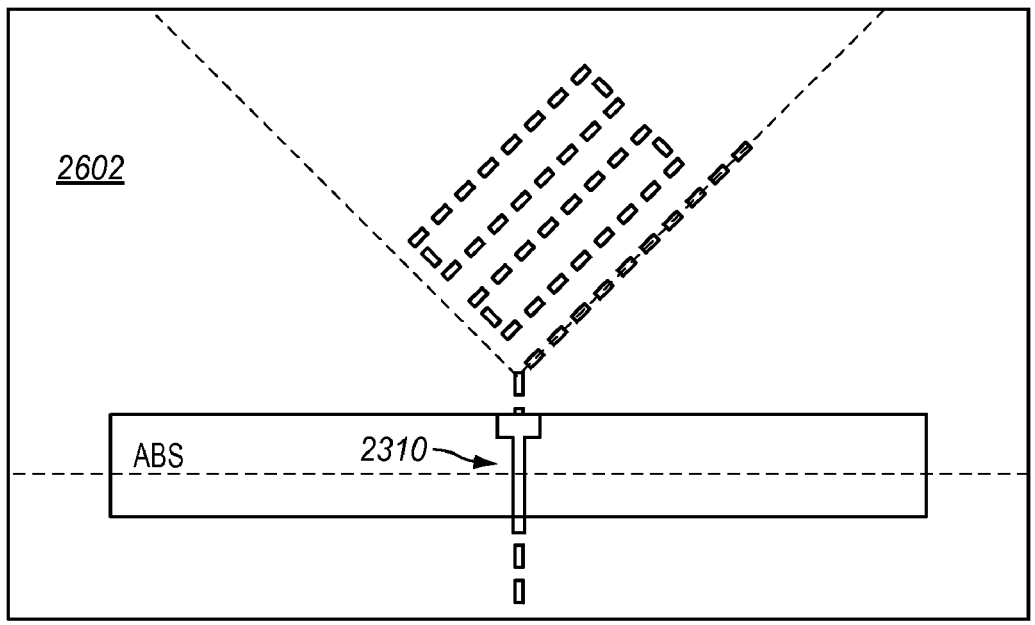

Step 1414 comprises plating magnetic material on the upper portion 2312 of the pole tip that is exposed by mask structure 2302 to increase the width of the upper portion 2312 of the pole tip (see FIG. 24). Step 1414 further comprises plating magnetic material on the yoke structure to increase the initial width of the yoke structure. Step 1416 then comprises removing mask structure 2302 (see FIG. 25) to expose the pole tip, which is indicated by reference number 2503. The yoke structure is illustrated in FIG. 25 by reference number 2508.

Step 1414 may expand the upper portion 2312 of pole tip 2503 and yoke structure 2508 by less than about three times the width of the lower portion 2312 of pole tip 2503. Thus, if the lower portion 2310 of pole tip 2503 has a width of 60 nanometers, then the upper portion 2312 of pole tip 2503 and yoke structure 2508 may be expanded to have a width less than about 180 nanometers. The point where pole tip 2503 expands from its initial width to the expanded width defines the flare point 2502 of the write pole. The lower portion 2310 of pole tip 2503 remains at the initial width of about 60 nanometers or less to effectively write to small data tracks. At the same time, the upper portion 2312 of pole tip 2503 is wider to provide adequate magnetic flux to the ABS of the write pole. Further, because pole tip 2503 and yoke structure 2508 are formed in the same fabrication steps, there is low reluctance in the write pole.

Step 1418 comprises depositing gap material on the write pole. The gap material may comprise a non-magnetic, electrically conductive material, such as Au, Rh, Ru, etc. Step 1420 comprises forming a third mask structure 2602 for a wrap-around shield (see FIG. 26). The materials under mask structure 2602 are illustrated with dotted lines. Mask structure 2602 includes an opening that exposes a region proximate to the lower portion 2310 of pole tip 2503 for a wrap-around shield. One of the edges 2604 of mask structure 2602 (which is the top edge in FIG. 26) defines a throat height for the write pole. The throat height is the height of a subsequently formed shield with respect to the ABS.

Figure 27:
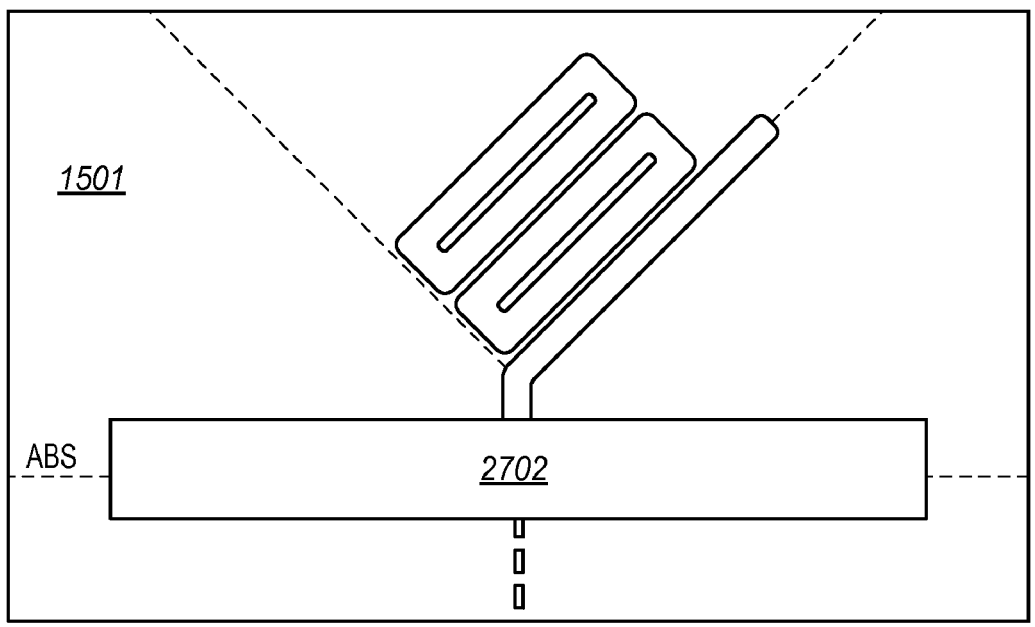
Figure 28:
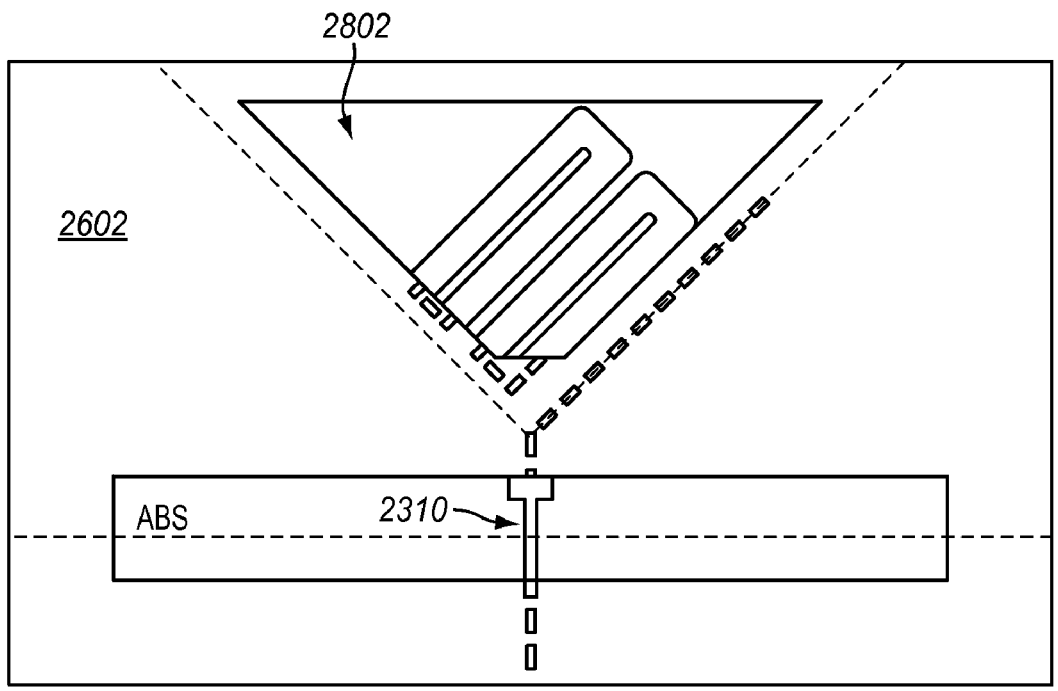
Figure 29:
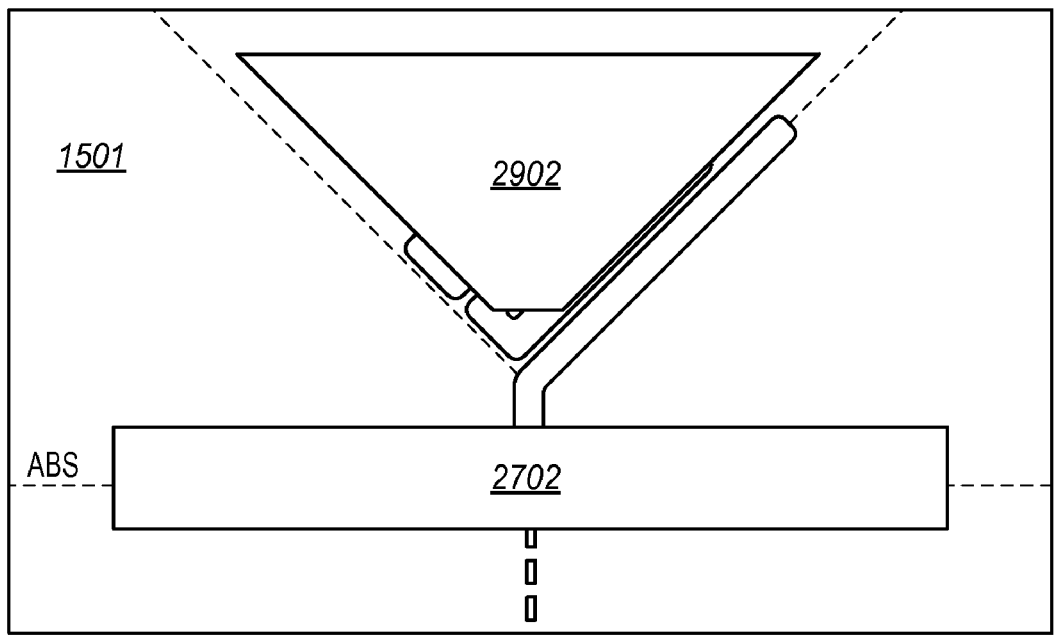

Step 1422 comprises forming a wrap-around shield 2702 in the opening of mask structure 2602 (see FIG. 27). Wrap-around shield 2702 may be plated or formed in another fabrication step. An edge of wrap-around shield 2702 (which is the top edge in FIG. 27) defines the throat height in relation to the ABS. Step 1424 comprises removing mask structure 2602 (see FIG. 27).

In addition to forming the wrap-around shield in steps 1420-1422, additional yoke structures may be formed. For instance, step 1420 may additionally include forming mask structure 2602 with an additional opening 2802 in a location of the yoke of the write pole (see FIG. 28). Step 1422 may additionally include forming a yoke stitch layer 2902 in the other opening 2802 of mask structure 2602 on the yoke structure (see FIG. 29). A yoke stitch layer refers to another layer of the yoke that is attached to the yoke structure, which was originally defined in the same processing steps as the pole tip.

Although specific embodiments were described herein, the scope of the invention is not limited to those specific embodiments. The scope of the invention is defined by the following claims and any equivalents thereof.

We claim:

1. A method of fabricating a magnetic write pole, the method comprising:
   forming a first mask structure on a magnetic layer, wherein the first mask structure corresponds with a location of a pole tip of the write pole and corresponds with a location of the yoke of the write pole;
   performing a removal process around the first mask structure to define the pole tip and part of the yoke;
   removing the first mask structure;
   forming a second mask structure on a lower portion of the pole tip proximate to an air bearing surface;
   expanding an upper portion of the pole tip with magnetic material to increase a width of the upper portion of the pole tip; and
   expanding the part of the yoke with the magnetic material to increase a width of the part of the yoke.

2. The method of claim 1 wherein forming a first mask structure comprises:
   forming a resist structure on the magnetic layer with vertical surfaces of the resist structure corresponding with the location of the pole tip and the location of the yoke;
   forming a coating layer on vertical and horizontal surfaces of the resist structure;
   performing a removal process to remove the coating layer on the horizontal surfaces of the resist structure resulting in the first mask structure formed from the remaining coating layer on the vertical surfaces; and
   removing the resist structure.

3. The method of claim 2 wherein forming a coating layer on vertical and horizontal surfaces of the resist structure comprises:
 performing an atomic layer deposition (ALD) process to form the coating layer on vertical and horizontal surfaces of the resist structure.

4. The method of claim 3 wherein the coating layer comprises alumina.

5. The method of claim 3 wherein the resist structure comprises polyimide.

6. The method of claim 1 wherein expanding an upper portion of the pole tip with magnetic material comprises:
 plating the magnetic material on the upper portion of the pole tip that is exposed by the second mask structure.

7. The method of claim 1 wherein expanding the part of the yoke with the magnetic material comprises:
 plating the magnetic material on the part of the yoke.

8. The method of claim 1 further comprising:
 depositing a non-magnetic material on the pole tip; and
 forming a wrap-around shield proximate to the pole tip.

9. The method of claim 1 further comprising:
 forming a yoke stitch layer on the part of the yoke.

10. The method of claim 1 wherein:
 the pole tip formed in the removal process has a width less than 60 nanometers; and
 the width of the upper portion of the pole tip after expanding with the magnetic material is less than three times the width of the lower portion of the pole tip.

11. A method of fabricating a magnetic write pole, the method comprising:
 forming a pole tip and part of a yoke structure using an atomic layer deposition (ALD) masking process;
 masking a lower portion of the pole tip proximate to an air bearing surface;
 plating an upper portion of the pole tip with magnetic material to increase an initial width of the upper portion of the pole tip; and
 plating the yoke structure with the magnetic material to increase an initial width of the yoke structure.

12. The method of claim 11 wherein forming a pole tip and part of a yoke structure using an ALD masking process comprises:
 forming a resist structure on a magnetic layer with vertical surfaces of the resist structure corresponding with a location of the pole tip and a location of the yoke of the write pole;
 forming a mask structure on the vertical surfaces of the resist structure, wherein the mask structure covers portions of the magnetic layer corresponding with the location of the pole tip and the location of the yoke;
 removing the resist structure;
 removing portions of the magnetic layer that are not covered by the vertical structure to form the pole tip of the magnetic write pole and the part of the yoke structure; and
 removing the vertical structure.

13. The method of claim 12 wherein the resist structure comprises polyimide.

14. The method of claim 12 wherein forming a mask structure comprises:
 forming the mask structure by depositing alumina with the ALD process.

15. The method of claim 11 further comprising:
 depositing a non-magnetic material on the pole tip; and
 forming a wrap-around shield proximate to the pole tip.

16. The method of claim 11 further comprising:
 forming a yoke stitch layer on the yoke structure.

* * * * *